United States Patent
Ellul et al.

(10) Patent No.: US 8,969,481 B2
(45) Date of Patent: Mar. 3, 2015

(54) PEROXIDE CURED TPV

(75) Inventors: Maria D. Ellul, Silver Lake Village, OH (US); Periagaram S. Ravishankar, Kingwood, TX (US)

(73) Assignee: ExxonMobil Chemical Patent Inc., Houston, TX (US)

( * ) Notice: Subject to any disclaimer, the term of this patent is extended or adjusted under 35 U.S.C. 154(b) by 408 days.

(21) Appl. No.: 13/127,826

(22) PCT Filed: Nov. 5, 2009

(86) PCT No.: PCT/US2009/063423
§ 371 (c)(1),
(2), (4) Date: Jun. 29, 2011

(87) PCT Pub. No.: WO2010/071718
PCT Pub. Date: Jun. 24, 2010

(65) Prior Publication Data
US 2011/0275764 A1 Nov. 10, 2011

Related U.S. Application Data

(60) Provisional application No. 61/138,839, filed on Dec. 18, 2008.

(51) Int. Cl.
| | | |
|---|---|---|
| C08L 23/04 | (2006.01) | |
| C08L 45/00 | (2006.01) | |
| C08L 23/10 | (2006.01) | |
| C08L 23/16 | (2006.01) | |

(52) U.S. Cl.
CPC ....... C08L 23/10 (2013.01); C08L 23/16 (2013.01)
USPC ............ 525/240; 525/191; 525/210; 525/211

(58) Field of Classification Search
None
See application file for complete search history.

(56) References Cited

U.S. PATENT DOCUMENTS

| | | | |
|---|---|---|---|
| 3,629,212 A | 12/1971 | Benedikter et al. | |
| 3,674,754 A | 7/1972 | Cameli et al. | |
| 4,016,342 A | 4/1977 | Wagensommer | |
| 4,306,041 A | 12/1981 | Cozewith et al. | |
| 4,510,303 A | 4/1985 | Oda et al. | |
| 5,656,693 A * | 8/1997 | Ellul et al. | 525/171 |
| 5,674,613 A | 10/1997 | Dharmarajan et al. | |
| 5,698,651 A | 12/1997 | Kawasaki et al. | |
| 6,207,756 B1 | 3/2001 | Datta et al. | |
| 6,225,426 B1 | 5/2001 | Gillis et al. | |
| 6,251,998 B1 | 6/2001 | Medsker et al. | |
| 6,281,316 B1 | 8/2001 | Wasserman et al. | |
| 6,319,998 B1 | 11/2001 | Cozewith et al. | |
| 6,806,336 B2 | 10/2004 | Ravishankar | |
| 7,135,533 B2 * | 11/2006 | Ravishankar | 526/282 |
| 2007/0142554 A1 * | 6/2007 | Ellul et al. | 525/192 |
| 2008/0033089 A1 | 2/2008 | Ellul et al. | |
| 2008/0287620 A1 * | 11/2008 | Ravishankar | 526/170 |

FOREIGN PATENT DOCUMENTS

| | | |
|---|---|---|
| EP | 0 227 206 | 7/1987 |
| EP | 0 784 062 | 7/1997 |
| EP | 0 843 701 | 5/1998 |
| EP | 0 843 702 | 5/1998 |
| EP | 1 088 855 | 4/2001 |
| WO | WO 98/02471 | 1/1998 |
| WO | WO 99/00434 | 1/1999 |
| WO | WO 99/45047 | 9/1999 |
| WO | WO 99/45062 | 9/1999 |

\* cited by examiner

*Primary Examiner* — Irina Krylova

(57) ABSTRACT

Thermoplastic elastomer compositions and methods for making same. The elastomer composition can include at least one partially cured rubber component that is an ethylene-alpha-olefin-vinyl norbornene elastomeric polymer, and at least one thermoplastic component. The rubber component is at least partially cured using a peroxide curative in an amount effective to yield a cure level of the rubber component of at least 85%. The rubber component has a molecular weight distribution (MWD) less than 6, and a branching index greater than 0.60.

8 Claims, No Drawings

US 8,969,481 B2

PEROXIDE CURED TPV

PRIORITY CLAIM

This application is a 371 National Stage Application of International Application No. PCT/US2009/063432, filed Nov. 5, 2009, and claims priority to and the benefit of U.S. Ser. No. 61/138,839, filed on Dec. 18, 2008, all of which are incorporated herein by reference in their entirety.

FIELD OF THE INVENTION

Embodiments described generally relate to thermoplastic elastomers, processes for making same, and articles made therefrom. More particularly, embodiments described relate to thermoplastic vulcanizates made from peroxide cured ethylene-propylene rubber.

BACKGROUND OF THE INVENTION

One type of thermoplastic elastomer (TPE) is a thermoplastic vulcanizate (TPV). TPV compositions are conventionally produced by dynamic vulcanization. Dynamic vulcanization is a process whereby a rubber component is crosslinked or vulcanized within a blend of at least one non-vulcanizing polymer component while undergoing mixing or masticating at some elevated temperature, which is usually greater than the melt temperature of the non-vulcanizing polymer component.

A TPV can be characterized by finely divided rubber particles dispersed within a plastic matrix. These rubber particles are typically crosslinked to promote elasticity. The physical properties of the rubber phase and those of the plastic matrix can influence the physical properties of the resulting TPV, in addition to other factors, such as the size and the concentration of the particles of the discontinuous phase, the presence of fillers, curatives, and other additives present in the composition, and the like. However, TPV compositions generally exhibit the processing characteristics of the plastic and the elasticity of the rubber, and are capable of providing many of the desirable properties of thermoset elastomers, yet are processable as thermoplastics.

Ethylene-based elastomers such as ethylene-propylene (alpha-olefin)-diene (EPDM) are generally polymers of very high molecular weight (as measured by their Mooney viscosity), and are often suitable for use in TPV applications. Many TPV compositions that utilize EPDM have varying amounts of a diene, which is usually one of 5-ethylidene-2-norbornene, 1,4-hexadiene, 1,6-octadiene, 5-methyl-1,4 hexadiene, and 3,7-dimethyl-1,6-octadiene. Such dienes have been found to provide peroxide cured TPV compositions with fair resistance to compression set among other mechanical properties. In TPV compositions having an EPDM polymer that is cured less than about 90 percent, compression set is generally unacceptably high for many applications, especially at elevated temperatures.

EPDM's containing vinyl norbornene (VNB), which is a non-conjugated diene having two polymerizable double bonds, are known from EP843698; EP843702 and EP843701. These polymers have long chain branching (LCB). High levels of LCB improve processability, but can impair physical properties of the final product after conversion of the polymer by extrusion or molding etc. The two double bonds are both capable of polymerization with olefins in the presence of transition metal catalysts.

The prior art describes the benefit of VNB over ethylidene norbornene (ENB). The VNB derived EPDM provides improved cure rate, cure state, and performance in free-radical curing, improved processability from the highly branched structure, and requires a low level of diene to provide suitable physical properties in the final product comparable to ENB derived EPDM.

WO99/00434 describes combining ENB, VNB and specific branching inhibitors to produce EPDM with reduced branching. The ENB derived units are present in amounts well in excess of the amount of VNB. The spectrum of LCB and molecular weight distribution (MWD) variations that can be obtained appear to be limited by the process characteristics (a branching modifier is used). Very low levels of branching can be hard to obtain because of cationic branching generated by the ENB. Broad MWD is favored.

It is known to make EPDM type polyolefins, generally those having ENB derived units, in a continuous stirred tank series reactor layout, primarily to obtain broader MWDs and the attendant processability benefits resulting therefrom. Reference is made to U.S. Pat. No. 4,306,041; EP227206; WO99/45047; and WO99/45062.

U.S. Pat. No. 6,319,998 and WO 99/45062 describe processes using metallocene type catalysts that have high activity and extremely efficient incorporation of diene. This leads to high levels of LCB, and in some cases the formation of gel.

Other references of interest can include: WO 99/00434, U.S. Pat. No. 6,207,756, WO 98/02471, U.S. Pat. Nos. 3,674,754, 4,510,303, 3,629,212, 4,016,342, 5,674,613, EP 1088855, U.S. Pat. No. 6,281,316, EP 784062, U.S. Pat. Nos. 4,510,303, 5,698,651 and 6,225,426.

There is still a need for yet further improvements in cure efficiency but without the debits incurred from too high a level of branching in VNB polymers.

SUMMARY OF THE INVENTION

Thermoplastic elastomer compositions and methods for making same are provided. In at least one specific embodiment, the elastomer composition can include at least one partially cured rubber component that is an ethylene-alpha-olefin-vinyl norbornene elastomeric polymer, and at least one thermoplastic component. The rubber component is at least partially cured using a peroxide curative in an amount effective to yield a cure level of the rubber component of at least 85%. The rubber component has a molecular weight distribution (MWD) less than 6, and a branching index greater than 0.60.

In at least one other specific embodiment, the elastomer composition can include about 15 wt % to about 90 wt % of at least one partially cured rubber component that is an ethylene-propylene-vinyl norbornene elastomeric polymer, wherein the vinyl norbornene content is about 0.2 wt % to about 5 wt % and the ethylene content is about 40 wt % to about 90 wt %. The elastomer composition can also include about 10 wt % to about 85 wt % of at least one thermoplastic component. The rubber component is at least partially cured using a peroxide curative in an amount effective to yield a cure level of the rubber component of at least 95%, and the rubber component has a molecular weight distribution (MWD) less than 6, and a branching index greater than 0.60.

In at least one other specific embodiment, the elastomer composition can include about 15 wt % to about 90 wt % of at least one partially cured rubber component that is an ethylene-propylene-vinyl norbornene elastomeric polymer, wherein the vinyl norbornene content is about 0.2 wt % to about 5.0 wt % and the ethylene content is about 40 wt % to about 90 wt %. The elastomer composition can also include about 10 wt % to about 85 wt % of at least one thermoplastic component comprising polypropylene having a heat of fusion of less than 210 J/g and greater than 90 J/g; and less than 5.0 phr oil. The rubber component is at least partially cured using a peroxide curative in an amount effective to yield a cure level of the rubber component of at least 95.0%. The rubber component has a molecular weight distribution (MWD) less than 6, and a branching index of 0.60 or more. The elastomer composition has a Mooney viscosity, ML (1+4 at 125° C.), as determined according to ASTM D1646, of less than 80, and a compression set of about 80% or less, as measured after 22 hours at 100° C. by test method ASTM D 395B.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Surprisingly, embodiments of the present invention provide a rubber component with significantly improved cure efficiency in peroxide-cured TPV compositions. The rubber component has a low diene content, broad range of ethylene content, low weight average molecular weight (Mw), and does not have to be oil extended. Preferably, the rubber component has no oil or substantially no oil. By "substantially no oil," it is meant that the rubber component contains less than 10 parts by weight per 100 parts by weight rubber (phr) oil, preferably less than 5 phr oil.

The rubber component is also substantially free from gel, by which is meant at least 80%, typically 100%, by weight of the polymerization product can be dissolved in a hydrocarbon solvent such as cyclohexane, typically used to dissolve EPDM. When gel is present in the polymer or if the molecular weight (Mw) is very high (greater than 10 MM), this portion will remain undissolved even at elevated temperatures.

Rubber Component

The "rubber component" can include one or more ethylene-alpha-olefin-diene elastomers. Suitable alpha-olefins can include any alpha-olefin having 2 to 12 carbon atoms, and more preferably any alpha-olefin having 2 to 8 carbon atoms. Ethylene, propylene, hexene and octene are preferred olefins. Preferably, the rubber component is an ethylene-propylene-diene terpolymer (EPDM) elastomer.

The rubber component can have an ethylene content of 40 wt % to 90 wt % (preferably 45 to 85 wt %, preferably 50 to 80 wt %) and a diene content of less than 15 wt % (preferably 0.5 to 15 wt %, preferably 1 to 12 wt %, preferably 2 to 10 wt %, preferably 3 to 9 wt %). In one or more embodiments, the rubber component can have an ethylene content of 50 wt % to 75 wt % (preferably 50 wt % to 70 wt %). In other embodiments, the rubber component can have a diene content of 0.2 wt % to 5 wt % (preferably 0.2 wt % to 3 wt %), or 0.5 wt % to 2 wt % (preferably 0.1 wt % to 1.5 wt %).

Suitable dienes can have at least two unsaturated bonds, at least one of which can be incorporated into the polymer. Suitable dienes include those that are straight chained, branched, cyclic, bridged ring, bicyclic, etc.; preferably the unsaturated bonds are non-conjugated. Preferred dienes include 5-ethylidene-2-norbornene (ENB), 5-vinyl-2-norbornene (VNB), divinyl benzene (DVB), dicyclopentadiene (DCPD), and 1,4-hexadiene. More preferably, the diene is VNB.

The rubber component can have a density of 0.885 $g/cm^3$ or less (preferably 0.88 $g/cm^3$ or less, preferably 0.87 $g/cm^3$ or less, preferably 0.865 $g/cm^3$ or less, preferably 0.86 $g/cm^3$ or less, preferably 0.855 $g/cm^3$ or less. In one or more embodiments, the density of the rubber component can range from a low of about 0.855 $g/cm^3$, 0.860 $g/cm^3$, or 0.865 $g/cm^3$ to a high of about 0.875, 0.880, or 0.885 $g/cm^3$.

In one or more embodiments, the rubber component can have a heat of fusion ($H_f$) of less than 70 J/g (preferably less than 60 J/g, preferably less than 50 J/g, preferably less than 40 J/g, preferably less than 30 J/g, preferably less than 20 J/g, preferably less than 10 J/g, preferably less than 5 J/g, preferably indiscernible).

In one or more embodiments, the rubber component can have ethylene or propylene crystallinity of less than 15 wt % (preferably less than 10 wt %, preferably less than 5 wt %, preferably less than 2 wt %, preferably undetectable).

In one or more embodiments, the rubber component can have a melting point ($T_m$) of 120° C. or less (preferably 100° C. or less, preferably 80° C. or less, preferably 70° C. or less, preferably 60° C. or less, preferably 50° C. or less, preferably 40° C. or less, preferably 35° C. or less, preferably undetectable).

In one or more embodiments, the rubber component can have a glass transition temperature ($T_g$) of −20° C. or less (preferably −30° C. or less, preferably −40° C. or less, preferably −50° C. or less, preferably −60° C. or less).

In one or more embodiments, the rubber component can have a weight average molecular weight ($M_W$) of 50 to 5,000 kg/mol (preferably 100 to 3,000 kg/mol, preferably 150 to 2,000 kg/mol, preferably 200 to 1,000 kg/mol).

In one or more embodiments, the rubber component can have a molecular weight distribution (weight average molecular weight/number average molecular weight ($M_w/M_n$)) of 1.5 to 40 (preferably 1.6 to 30, preferably 1.7 to 20, preferably 1.8 to 10). In one or more embodiments, the rubber component has a MWD of from about 1 to about 20; about 3 to about 10; or about 4 to about 6. In one or more embodiments, the rubber component has a MWD of less than 6, less than 5, less than 4, less than 3, less than 2, or less than 1.

In one or more embodiments, the rubber component can have a Mooney viscosity, ML (1+4) at 125° C., as determined according to ASTM D1646, of 1 to 100 (preferably 5 to 95, preferably 10 to 90, preferably 15 to 85, preferably 20 to 80, preferably 30 to 80). In one or more embodiments, the rubber component can have a Mooney viscosity, ML (1+4) at 125° C., ranging from a low of about 10, 20, or 30 to a high of about 80, 90, or 100. In one or more embodiments, the rubber component can have a Mooney viscosity, ML(1+4) at 125° C., of from 10 to 100 or of from 20 to 80.

In one or more embodiments, the rubber component can have a compression set of about 50 percent or less, as measured after 22 hours at 100° C. by test method ASTM D 395B. The compression set is preferably less than 45%, less than 40%, less than 35%, less than 30%, less than 25%, or less than 20%, as measured after 22 hours at 100° C. by test method ASTM D 395B. More preferably, the compression set is about 20% to about 50%, most preferably 20% to about 46%. In one or more embodiments, the compression set ranges from a low of about 20%, 25%, or 30% to a high of about 50%, 75, or 80%, as measured after 22 hours at 100° C. by test method ASTM D 395B.

In one or more embodiments, the rubber component can have a branching index (BI) of at least 0.60, preferably at least 0.70, in other embodiments at least 0.80, in other embodiments at least 0.85, in other embodiments at least 0.90, in other embodiments at least 0.92, in other embodiments at least 0.95, and in other embodiments at least 1.0. In one or more embodiments, the rubber component can have a branching index (BI) of greater than 0.60, greater than 0.65, greater than 0.70, greater than 0.75, greater than 0.80, greater than 0.85, or greater than 0.90. In one or more embodiments, the rubber component can have a branching index (BI) of at least 0.61, or at least 0.65, or at least 0.71, or at least 0.75, or at least 0.81, or at least 0.85.

The BI can be calculated using a series of four laboratory measurements of polymer properties in solution, as disclosed by VerStrat in "Ethylene-Propylene Elastomers," 6, ENCYCLOPEDIA OF POLYMER SCIENCE 2nd edition (1986), which is incorporated by reference herein. The four measurements are:

(i) weight average molecular weight ($M_w$) measured using a low angle laser light scattering detector (LALLS) in combination with Gel Permeation Chromatography (GPC), abbreviated herein as "$M_{w\,GPC\,LALLS}$";

(ii) weight average molecular weight ($M_w$) determined using a differential refractive index (DRI) detector in combination with GPC, and abbreviated herein as "$M_{w\,GPC\,DRI}$";

(iii) viscosity average molecular weight ($M_v$) determined using a differential refractive index (DRI) detector in combination with GPC, and abbreviated herein as "$M_{v\,GPC\,DRI}$"; and (iv) intrinsic viscosity (IV) measured in decalin at 135° C.

The first three measurements (i, ii, and iii) are obtained via GPC using a filtered dilute solution of the polymer in trichlorobenzene.

The average branching index factor (BI), which may be simply referred to as average branching index, as disclosed herein is defined by Equation (1) as:

$$BI = \frac{M_{v,br} \times M_{w,GPC\,DRI}}{M_{w,GPC\,LALLS} \times M_{v,GPC\,DRI}} \quad (1)$$

where, $M_{v,br}=(IV/k)^{1/a}$; wherein "k" is a measured constant from a linear polymer as described by Paul J. Flory in PRINCIPLES OF POLYMER CHEMISTRY, p. 310 (1953), and the summation is over all the slices in the distribution, and wherein "a" is the Mark-Houwink constant (=0.759 for ethylene, propylene diene elastomeric polymers in decalin at 135° C.).

From equation (3) it follows that the average branching index factor for a linear polymer is 1.0. For branched polymers, the extent of branching is defined relative to a linear polymer. At a constant number average molecular weight $M_n$, $(M_w)_{branch}>(M_w)_{linear}$, BI for branched polymers is less than 1.0 and a smaller BI value denotes a higher level of branching. In instances wherein measuring IV in decalin is impossible, IV may be measured for comparison to the instant disclosure using a viscosity detector in tandem with DRI and LALLS detectors in a so-called GPC-3D instrument. In this case, "k" and "a" values are selected which are appropriate for the GPC solvent used in making the determination.

In one or more embodiments, the rubber component can be functionalized. For example, the rubber component can be functionalized by reacting with organic compounds with polar moieties, such as amine-, carboxy-, and/or epoxy-moieties.

The rubber component can be made by any suitable process, including slurry, solution, gas-phase, and high-pressure processes, using a catalyst system appropriate for the polymerization of polyolefins, such as Ziegler-Natta and metallocene catalyst systems, or combinations thereof. In one or more embodiments, synthesis involves a vanadium-based catalyst system in a solution or slurry process.

Preferably, the rubber component is produced using a single-site catalyst system, such as a metallocene catalyst, in a solution, slurry, or gas-phase process at conditions sufficient to produce a rubber component having an Mw/Mn of 1.5 to 2.5.

The polymerization is conducted in the presence of a catalyst system comprising at least one metallocene catalyst compound and a non-coordinating anion activator. The at least one metallocene catalyst compound comprises an indenyl (In) complex having the general formula (I):

$$(In^1R^1{}_m)R^3(In^2R^2{}_p)MX_q \quad (I)$$

Each $R^1$ is a substituent of the indenyl ring $In^1$, and each $R^2$ is a substituent of the indenyl ring $In^2$. Each $R^1$ and $R^2$ is, independently, a halogen or a hydrocarbyl, halocarbyl, hydrocarbyl-substituted organometalloid or halocarbyl-substituted organometalloid group containing up to about 20 carbon atoms. At least one $R^1$ or $R^2$ substituent is bonded to the 2-position or the 4-position of its associated indenyl ring; m is 1 to 6; p is 1 to 6; $R^3$ is a bridging group, such that the number of atoms in the direct chain between the $(In^1R^1{}_m)$ ligand and the $(In^2R^2{}_p)$ ligand is 1 to 8. M is a transition metal from Group 3, 4, 5 or 6 of the Periodic Table of the Elements, or an actinide or lanthanide metal atom and is preferably in its highest oxidation state; q is equal to the valence of M minus 2; and each X is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, provided that two X groups can be joined and bound to the metal atom to form a metallacycle ring containing from about 3 to about 20 carbon atoms; or two X groups together can be an olefin, diolefin or aryne ligand, and provided further that each X is not a substituted or unsubstituted cyclopentadienyl ring.

In one or more embodiments, each $R^1$ and $R^2$ substituent can be a hydrocarbyl group, such as a methyl or phenyl group, and bonded to the 2-position or the 4-position of its associated indenyl ring. Typically m is 1 or 2, especially 2; and p is 1 or 2, especially 2. In one or more embodiments, $In^1$ of the ligand $(In^1R^1{}_m)$ and $In^2$ of ligand $(In^2R^2{}_p)$ are the same and typically the entire ligands $(In^1R^1{}_m)$ and $(In^2R^2{}_p)$ are the same so that the compound of formula (I) is a bridged bisindenyl compound.

In one or more embodiments, $R^3$ is a bridging group containing a Group 13, 14, 15, or 16 element and particularly an element selected from boron, sulfur, oxygen, nitrogen, phosphorus, carbon, silicon, germanium and selenium. In one embodiment $R^3$ is selected from —$SiR^4{}_2$-, —$CR^4{}_2$-, and —$CR^4{}_2$—$CR^{42}$-; wherein $R^4$, independently, is selected from hydrogen, alkyl, aryl, silyl, halogenated alkyl, halogenated aryl, and mixtures thereof. In one or more embodiments, $R^3$ can be —$Si(CH_3)_2$.

In one or more embodiments, the compound of formula (I) has at least one of rac-(dimethylsilyl)bis(2-methyl-4-phenylindenyl)zirconium dimethyl and rac-(dimethylsilyl)bis(2-methyl-4-phenylindenyl)hafnium dimethyl.

In addition to the metallocene compound of formula (I), the catalyst system can further include at least one further metallocene catalyst compound having the general formula (II):

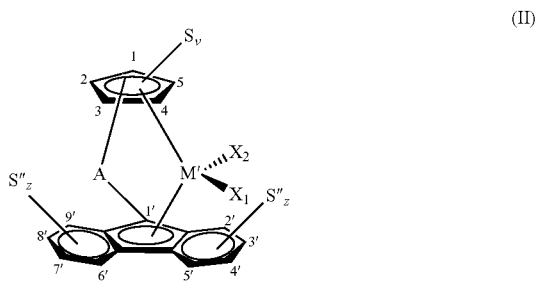

(II)

M' is a Group 3, 4, 5 or 6 transition metal atom, or a lanthanide metal atom, or actinide metal atom. Each substituent group S is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S groups can be joined to form a $C_4$ to $C_{20}$ ring to give a saturated or unsaturated polycyclic ligand. The subscript "v" denotes the carbon atom on the cyclopentadienyl ring to which the substituent is bonded and where there can be zero to four substituents, S, on the cyclopentadienyl ring.

Each substituent group S" is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S" groups can joined to form a $C_4$ to $C_{20}$ ring to give a saturated or unsaturated polycyclic ligand.

Subscript "z" denotes the carbon atom on the fluorenyl ring to which the substituent is bonded and where there can be zero to seven substituents, S", on the fluorenyl ring. A is a bridging group. Each of $X_1$ and $X_2$ is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; provided that $X_1$ and $X_2$ can be joined and bound to the metal atom to form a metallacycle ring containing from about 3 to about 20 carbon atoms and or $X_1$ and $X_2$ together can be an olefin, diolefin or aryne ligand, and with the further proviso that neither $X_1$ nor $X_2$ is not a substituted or unsubstituted cyclopentadienyl ring.

The term "symmetrically substituted" in relation to the S ligands in formula (II) is defined to mean that the cyclopentadienyl ring is substituted in the 2 and 5 positions and/or 3 and 4 positions with S groups that are of approximately of the same steric bulk. Typically, the size of these S groups is within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring can be substituted at all four sites with S groups and be considered symmetric as long as each of the symmetrical pairs is of similar steric bulk. Additionally, two adjacent S groups in the 3 and 4 position can be linked to form a ring provided that the new ring is also symmetrically substituted.

Typically, if present, each $S_v$ is independently chosen such that the metallocene framework has a plane of symmetry containing the metal center and bisecting the Flu- and Cp-rings. The A ligand need not be symmetrical—for example dimethylsilyl or methylphenylsilyl will not affect the stereochemistry of the polymer produced. Because of the distant placement of the S" substituents on the fluorenyl ring, these substituents need not be symmetrically placed on the fluorenyl ring. Hence, the fluorenyl ring can be substituted with up to 7 substituents that can be the same or different.

In one or more embodiments, A is a bridging group containing a Group 13, 14, 15, or 16 element and particularly an element selected from boron, sulfur, oxygen, nitrogen, phosphorus, carbon, silicon, germanium and selenium. In one or more embodiments, A is selected from $-SiR^4_2-$, $-CR^4_2-$, and $-CR^4_2-CR^4_2-$; wherein $R^4$, independently, is selected from hydrogen, alkyl, aryl, silyl, halogenated alkyl, halogenated aryl, and mixtures thereof.

Illustrative, but not limiting, examples of suitable unsymmetrical cyclopentadienyl metallocenes of the type described in formula (II) above include:

μ-$(C_6H_5)_2$ C(cyclopentadienyl)(fluorenyl)M$(CH_3)_2$;
μ-$(C_6H_5)_2$ C(3-methylcyclopentadienyl)(fluorenyl)M$(CH_3)_2$;
μ-$(CH_3)_2$ C(cyclopentadienyl)(fluorenyl)M$(CH_3)_2$; and
μ-(p-triethylsilylphenyl)$_2$ C(cyclopentadienyl)(3,8-di-t-butylfluorenyl) M$(CH_3)_2$, wherein M is Zr or Hf.

In one or more embodiments, the catalyst system employed can further include one or more metallocene catalyst compounds having the general formula (III):

(III)

Each of $In^3$ and $In^4$ can be an unsubstituted indenyl ring; Y is a bridging group, such that the number of atoms in the direct chain between the $In^3$ ligand and the $In^4$ ligand is from 1 to 8, M" is a transition metal from Group 3, 4, 5 or 6 of the Periodic Table of the Elements, or an actinide or lanthanide metal; n is equal to the valence of M" minus 2; and each X' is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; provided that two X' groups can be joined and bound to the metal atom to form a metallacycle ring containing from about 3 to about 20 carbon atoms; or two X' groups together can be an olefin, diolefin or aryne ligand.

In one or more embodiments, Y is a bridging group containing a Group 13, 14, 15, or 16 element and particularly an element selected from boron, sulfur, oxygen, nitrogen, phosphorus, carbon, silicon, germanium and selenium. In one embodiment Y is selected from—$SiR^4_2-$, $-CR^4_2-$, and $-CR^4_2-CR^4_2-$; wherein $R^4$, independently, is selected from hydrogen, alkyl, aryl, silyl, halogenated alkyl, halogenated aryl, and mixtures thereof. Typically, Y is $-Si(CH_3)_2$.

In one or more embodiments, the compound of formula (III) comprises at least one of rac-(dimethylsilyl)bisindenylzirconium dimethyl and rac-(dimethylsilyl)bisindenylhafnium dimethyl.

The catalyst system employed in the present process can comprise a mixture of the metallocene compound of formula (I) with the metallocene compound of formula (II) alone, or with the metallocene compound of formula (III) alone or with a combination of the metallocene compounds (II) and (III).

Typically, the weight ratio of the compound of formula (II) and/or the compound of formula (III) to the compound of formula (I) in the catalyst system used in the present process is between 0 and about 0.9.

In addition to the metallocene component(s), the catalyst system comprises a non-coordinating anion (NCA) activator.

As used herein, the term "non-coordinating anion" means an anion that does not coordinate to a transition metal cation thereby remaining sufficiently labile to be displaced by a neutral Lewis base. "Compatible" NCAs are those which are not degraded to neutrality when the initially formed complex decomposes. Further, the anion will not transfer an anionic substituent or fragment to the cation so as to cause it to form a neutral four coordinate metallocene compound and a neutral by-product from the anion. NCAs are preferably those which are compatible and stabilize the metallocene cation in the sense of balancing its ionic charge, yet retain sufficient lability to permit displacement by an ethylenically or acetylenically unsaturated monomer during polymerization. Additionally, the anions used are typically large or bulky in the sense of having sufficient molecular size to inhibit or prevent neutralization of the metallocene cation by Lewis bases other than the polymerizable monomers that can be present in the polymerization process. Typically, the anion will have a molecular size of greater than or equal to about 4 angstroms. NCA-generating activators of the type described in EP277004 are particularly useful in the present process.

In one or more embodiments, the non-coordinating anion activator can be represented by the following formula (IV):

$(L-H)_d^+ (A^{d-})$                                                     (IV)

wherein:
L is an neutral Lewis base;
H is hydrogen;
$(L-H)^+$ is a Bronsted acid;
$A^{d-}$ is a non-coordinating anion having the charge d−; and
d is an integer from 1 to 3.

The cation component, $(L-H)_d^+$ can include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The anion component $A^{d-}$ includes those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a perfluorinated aryl group, especially a perfluoronaphthyl group and/or a perfluorophenyl group. Examples of suitable $A^{d-}$ also include diboron compounds as disclosed in U.S. Pat. No. 5,447,895, which is fully incorporated herein by reference.

Illustrative, but not limiting, examples of suitable activators include N,N-dimethylanilinium tetra(perfluorophenyl) borate, N,N-dimethylanilinium tetrakis(perfluoronapthyl) borate, N,N-dimethylanilinium tetrakis(perfluorobiphenyl) borate, N,N-dimethylanilinium tetrakis(3,5-bis (trifluoromethyl)phenyl)borate, triphenylcarbenium tetrakis (perfluoronapthyl)borate, triphenylcarbenium tetrakis (perfluorobiphenyl)borate, triphenylcarbenium tetrakis(3,5-bis(trifluoromethyl)phenyl)borate, and triphenylcarbenium tetra(perfluorophenyl)borate.

Other Elastomers

In one or more embodiments, the composition can include one or more other elastomers including natural rubber, polyisoprene, polyisobutylene, polybutadiene, butyl, chlorobutyl, bromobutyl, nitrile, ethylene-vinyl acetate, chlorinated polyethylene, and chloroprene.

In one or more embodiments, the rubber component further includes one or more ethylene-propylene (EP) elastomers. A suitable EP elastomer can have an ethylene content of 40 to 80 wt % (preferably 45 to 75 wt %, preferably 50 to 70 wt %). A suitable EP elastomer can also have an ethylene content of 5 to 25 wt % (preferably 10 to 20 wt %).

In one or more embodiments, the rubber component is or includes a blend of one or more EPDM elastomers and one or more EP elastomers. In other embodiments, the rubber component is or includes a blend of two or more EPDM elastomers. In further embodiments, the rubber component is or includes blends of functionalized and unfunctionalized EPDM elastomers and optionally functionalized and/or unfunctionalized EP elastomers.

Thermoplastic Component

The thermoplastic component can be any material that is not a "rubber" and that is a polymer or polymer blend considered by persons skilled in the art as being thermoplastic in nature, e.g., a polymer that softens when exposed to heat and returns to its original condition when cooled to room temperature. The thermoplastic component can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

In one or more embodiments, the thermoplastic component can be chosen from crystalline and crystallizable polyolefins, polyamide, polyimides, polyesters, polyamide and fluorine-containing thermoplastics. Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the thermoplastic component is unvulcanized or non cross-linked. If polyethylene is the polyolefin material of choice, it will generally have a density in the range of from about 0.86 g/cc to about 0.97 g/cc. Preferred ranges are 0.86 g/cc to 0.97 g/cc; or 0.88 g/cc to 0.95 g/cc, with the most preferred being in the range of from about 0.90 g/cc to about 0.92 g/cc.

In one or more embodiments, the thermoplastic component can be or include polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or syndiotactic sequences, or both. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins.

In one or more embodiments, the thermoplastic component is or includes isotactic polypropylene. Preferably, the thermoplastic component contains one or more crystalline propylene homopolymers or copolymers of propylene having a melting temperature of from 110° C. to 170° C. or higher as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such thermoplastic components and methods for making the same are described in U.S. Pat. No. 6,342,565.

The term "random polypropylene" as used herein broadly means a single phase copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

In one or more embodiments, the thermoplastic component has a weight average molecular weight from about 200,000 to about 2,000,000, and a number average molecular weight from about 80,000 to about 800,000. More preferably, the thermoplastic component has a weight average molecular weight from about 300,000 to about 600,000, and a number average molecular weight from about 90,000 to about 150,000.

In one or more embodiments, the thermoplastic component has a melt temperature ($T_m$) that is from about 150° C. to about 175° C., more preferably from about 155° C. to about 170° C., and even more preferably from about 160° C. to about 170° C. The glass transition temperature ($T_g$) of these resins is preferably from about −5° C. to about 10° C., more preferably from about −3° C. to about 5° C., and even more preferably from about 0° C. to about 2° C. The crystallization temperature ($T_c$) of these resins is preferably at least about 75° C., more preferably at least about 95° C., even more preferably at least about 100° C., and still more preferably at least 105° C., with the preferred crystallization temperature ranging from 105° to 110° C.

In one or more embodiments, the thermoplastic component can have a heat of fusion of at least 50 J/g, preferably in excess of 75 J/g, more preferably in excess of 100 J/g, and even more preferably in excess of 120 J/g. Preferably, the thermoplastic component has a heat of fusion of from about 200 J/g to about 220 J/g. More preferably, the thermoplastic component has a heat of fusion of about 208 J/g or about 210 J/g.

In one or more embodiments, the thermoplastic component can be a polypropylene having a high MFI (e.g., from a low of 10, or 15, or 20 g/10 min to a high of 25 to 30 g/10 min, as measured by ASTM-D1238). Preferably, the polypropylene has a lower MFI, e.g., a "fractional" polypropylene which has an MFI less than 2.0 g/10 min, less than 1.0 g/10 min, less than 0.8 g/10 min, or less than 0.5 g/10 min.

A preferred thermoplastic component is a high-crystallinity isotactic or syndiotactic polypropylene. This polypropylene generally has a density of from about 0.85 to about 0.91 g/cc, with the largely isotactic polypropylene having a density of from about 0.90 to about 0.91 g/cc, and a number average molecular weight of about 120,000 and a weight average molecular weight of about 590,000.

In one or more embodiments, the thermoplastic resin component can be or include a "propylene-based copolymer." A "propylene-based copolymer" includes at least two different types of monomer units, one of which is propylene. Suitable monomer units include, but are not limited to, ethylene and higher alpha-olefins ranging from $C_4$ to $C_{20}$, such as, for example, 1-butene, 4-methyl-1-pentene, 1-hexene or 1-octene and 1-decene, or mixtures thereof, for example. Preferably, ethylene is copolymerized with propylene, so that the propylene-based copolymer includes propylene-derived units (units on the polymer chain derived from propylene monomers) and ethylene-derived units (units on the polymer chain derived from ethylene monomers).

In one or more embodiments, the propylene-based copolymer is made using random polymerization methods, including those described in U.S. Patent Nos.: 6,288,171; 6,525,157; 5,712,352; 5,693,727; 5,677,375; 5,668,228; 5,665,818; 5,627,242; 5,616,661; 5,462,999; 5,453,471; 5,436,304; 5,405,922; 5,352,749; 5,317,036; 5,028,670; 5,001,205; 4,613,484; 4,588,790; 4,543,399; 3,248,179; as well as U.S. Pat. Nos. 5,696,213; 5,625,016; EP 0 794 200; EP 0 802 202; and EP 0 634 421. However, the propylene-based copolymer is not limited by any particular polymerization method. Suitable polymerization methods include gas phase, slurry, and solution, for example.

Methods and catalysts for producing the propylene-based copolymers are found in publications U.S. Pat. Nos. 7,232,871 and 6,881,800, and WO 2005/049672. Pyridine amine complexes, such as those described in U.S. Pat. No. 6,960,635 are also useful to produce the propylene-based copolymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion. See, for example, EP 1 070 087. The catalyst described in EP 1 614 699 could also be used for the production of backbones suitable for the propylene-based copolymer.

The propylene-based copolymer can have an average propylene content of 60 wt % or more, based on the weight of the copolymer. The propylene-based copolymer can have an average propylene content of from about 60 wt % to about 93 wt %, more preferably from about 60 wt % to about 90 wt %, more preferably from about 60 wt % to about 87 wt %, more preferably from about 60 wt % to about 82 wt %, more preferably from about 60 wt % to about 75 wt % based on the weight of the copolymer. Other preferred ranges are from about 70 wt % to about 91 wt % propylene-derived units, more preferably from about 75 wt % to about 90 wt % propylene-derived units, more preferably from about 80 wt % to about 89 wt % propylene-derived units, and more preferably from about 80 wt % to about 88 wt % propylene-derived units, and more preferably from about 80 wt % to about 87 wt % propylene based on the weight of the copolymer. In one embodiment, the balance comprises units derived from one or more α-olefins. The one or more α-olefins may comprise ethylene, or one or more $C_4$-$C_{20}$ α-olefin or a combination of ethylene and one or more $C_4$-$C_{20}$ α-olefin. In another embodiment, the one or more α-olefins may comprise ethylene, or one or more $C_4$-$C_{12}$ α-olefins or a combination of ethylene and one or more $C_4$-$C_{12}$ α-olefins.

In one or more embodiments, the one or more α-olefins is or includes ethylene. The ethylene content can be greater than 8 wt % and up to about 30 wt % based on total weight of the propylene-based copolymer. The ethylene content can be of from about 10 wt % to about 15 wt % based on total weight of the propylene-based copolymer. In one or more embodiments, the ethylene content can range from a low of about 8 wt %, 10 wt %, or 12 wt % to a high of about 15 wt %, 20 wt % or 30 wt %.

In another embodiment, the one or more α-olefins is or includes butene. The butene content can be greater than 8 wt % and up to about 30 wt % based on total weight of the propylene-based copolymer. The butene content can be of from about 10 wt % to about 15 wt % based on total weight of the propylene-based copolymer. In one or more embodiments, the butene content can range from a low of about 8 wt %, 10 wt %, or 12 wt % to a high of about 15 wt %, 20 wt % or 30 wt %.

The propylene-based copolymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D as described herein.

In one or more embodiments above or elsewhere herein, the propylene-based copolymer can have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 400,000, more preferably a Mw of about 60,000 to about 300,000, more preferably a Mw of about 70,000 to about 250,000, wherein Mw is determined as described herein. In one or more embodiments, the propylene-based copolymer can have a Mw ranging from a low of about 70,000, about 80,000, about 90,000, about 100,000, or about 120,000 to a high of about 160,000, about 180,000, about 200,000, about 220,000, or about 250,000.

In one or more embodiments above or elsewhere herein, the propylene-based copolymer can have a Mn of about 2,500 to about 2,500,000 g/mole, more preferably a Mn of about 5,000 to about 500,000, more preferably a Mn of about 10,000 to about 250,000, more preferably a Mn of about 25,000 to about 200,000, wherein Mn is determined as described herein.

In one or more embodiments above or elsewhere herein, the propylene-based copolymer can have a Mz of about 10,000 to about 7,000,000 g/mole, more preferably a Mz of about 50,000 to about 1,000,000, more preferably a Mz of about 80,000 to about 700,000, more preferably a Mz of about 100,000 to about 500,000, wherein Mz is determined as described herein.

The molecular weight distribution index (MWD =(Mw/Mn)), sometimes referred to as a "polydispersity index" (PDI), of the propylene-based copolymer can be about 1.5 to 40. In an embodiment the MWD can have an upper limit of about 40, or 20, or 10, or 5, or 4.5, or 4, or 3, or 2.5, or 2.4, or 2.2 and a lower limit of about 1.3, or 1.5, or 1.7, or 1.8, or 2.0, or 2.1. In one or more embodiments above or elsewhere herein, the MWD of the propylene-based copolymer is about 1.8 to 5, more preferably 1.8 to 3, and most preferably about 2.1 to 2.4. Techniques for determining the molecular weight (Mn and Mw) and molecular weight distribution (MWD) can be found in U.S. Pat. No. 4,540,753, Verstrate et al., "Near Monodisperse Ethylene-Propylene Copolymers by Direct Ziegler-Natta Polymerization. Preparation, Characterization, Properties," 21 MACROMOLECULES, 3360-3382 (1988), and in accordance with the procedures disclosed in U.S. Pat. No. 6,525,157, particularly column 5, lines 1-44.

In one or more embodiments above or elsewhere herein, the propylene-based copolymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-based copolymer and $\eta_l$ is the intrinsic viscosity of a linear polymer of the same viscosity-averaged molecular weight ($M_v$) as the propylene-based copolymer. $\eta_l = KM_v^\alpha$, K and α were measured values for linear polymers and should be obtained on the same instrument as the one used for the g' index measurement.

In one or more embodiments above or elsewhere herein, the propylene-based copolymer can have a density of about 0.85 g/cm³ to about 0.92 g/cm³, more preferably, about 0.87 g/cm³ to 0.90 g/cm³, more preferably about 0.88 g/cm³ to about 0.89 g/cm³ at room temperature as measured per the ASTM D-1505 test method.

In one or more embodiments above or elsewhere herein, the propylene-based copolymer can have a MFR (ASTM D-1238 @ 2.16 kg weight and 230° C.), equal to or greater than 0.2 g/10 min as measured according to the ASTM D-1238 test method as modified (described below). Preferably, the MFR (ASTM D-1238 @ 2.16 kg weight and 230° C.) is from about 0.5 g/10 min to about 200 g/10 min and more preferably from about 1 g/10 min to about 100 g/10 min. In an embodiment, the propylene-based copolymer has an MFR upper limit of about 200 g/10 min, about 150 g/10 min, about 100 g/10 min, about 75 g/10 min, about 50 g/10 min, about 30 g/10 min, about 25 g/10 min, or about 20 g/10 min and a lower limit of about 0.1 g/10 min, about 0.5 g/10 min, about 1 g/10 min, about 2 g/10 min, about 3 g/10 min, about 4 g/10 min, about 5 g/10 min, about 8 g/10 min, or about 10 g/10 min. In another embodiment, the propylene-based copolymer has an MFR of 0.5 g/10 min to 200 g/10 min, preferably from 2 g/10 min to 30 g/10 min, more preferably from 3g/10 min to 21 g/10 min, more preferably from 5 g/10 min to 30 g/10 min, more preferably 10 g/10 min to 30 g/10 min, more preferably 10 g/10 min to about 25 g/10 min, or more preferably 2 g/10 min to about 10 g/10 min.

The propylene-based copolymer can have a Mooney viscosity, ML (1+4) at 125° C., as determined according to ASTM D1646, of less than 100, more preferably less than 75, even more preferably less than 60, most preferably less than 30. In one or more embodiments above or elsewhere herein, the Mooney viscosity can range from a low of about 1, 5, 10, or 15 to a high of about 30, 60, 75 or 100.

In one or more embodiments, the propylene-based copolymer has a Shore A hardness of less than about 90. In one or more embodiments, the propylene-based copolymer has a Shore A hardness of about 45 to about 90. In one or more embodiments, the propylene-based copolymer has a Shore A hardness of about 55 to about 80.

Due to the introduction of errors in the insertion of propylene and/or by the presence of comonomer, the crystallinity and the melting point of the propylene-based copolymer are reduced compared to highly isotactic polypropylene. For example, the propylene-derived crystallinity of the propylene-based copolymer may range from about 2% to about 65% in one embodiment and from about 5% to about 40% in another embodiment as measured by DSC.

In one or more embodiments above or elsewhere herein, the propylene-based copolymer can have a heat of fusion (Hf) determined according to the DSC procedure described later, which is greater than or equal to about 0.5 Joules per gram (J/g), and is≤about 80 J/g, preferably≤about 75 J/g, preferably≤about 70 J/g, more preferably≤about 60 J/g, more preferably≤about 50 J/g, more preferably≤about 45 J/g, more preferably≤about 35 J/g. Also preferably, the propylene-based copolymer has a heat of fusion that is greater than or equal to about 1 J/g, preferably greater than or equal to about 5 J/g. In another embodiment, the propylene-based copolymer can have a heat of fusion (Hf), which is from about 0.5 J/g to about 75 J/g, preferably from about 1 J/g to about 75 J/g, more preferably from about 0.5 J/g to about 35 J/g. In one or more embodiments, the heat of fusion ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, 45 J/g, or 50 J/g, or 60 J/g or 70 J/g, or 75 J/g, or 80 J/g.

Preferred propylene-based copolymers and compositions can be characterized in terms of both their melting points (Tm) and heats of fusion, which properties can be influenced by the presence of comonomers or steric irregularities that hinder the formation of crystallites by the polymer chains. The crystallinity of the propylene-based copolymer can also be expressed in terms of percentage of crystallinity (i.e. % crystallinity). In certain embodiments above or elsewhere herein, the propylene-based copolymer is substantially amorphous characterized in that it has 0% crystallinity as determined according to the DSC procedure described below. In other embodiments above or elsewhere herein, the propylene-based copolymer has a percent (%) crystallinity of from 0.5% to 40%, preferably 1% to 30%, more preferably 5% to 25% wherein % crystallinity is determined according to the DSC procedure described below. In another embodiment, the propylene-based copolymer preferably has a crystallinity of less than 40%, preferably about 0.25% to about 25%, more preferably from about 0.5% to about 22%, and most preferably from about 0.5% to about 20%. As disclosed above, the thermal energy for the highest order of polypropylene is estimated at 189 J/g (i.e., 100% crystallinity is equal to 189 J/g.).

In addition to this level of crystallinity, the propylene-based copolymer preferably has a single broad melting transition. However, the propylene-based copolymer can show secondary melting peaks adjacent to the principal peak, but for purposes herein, such secondary melting peaks are considered together as a single melting point, with the highest of these peaks (relative to baseline as described herein) being considered the melting point of the propylene-based copolymer.

The propylene-based copolymer preferably has a melting point (measured by DSC) of equal to or less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

Heat of fusion, % crystallinity and melting temperature of the propylene-based copolymer can be determined, for example by a Differential Scanning calorimetry (DSC) procedure using the following steps.

About 0.5 g is placed between two sheets of MYLAR film (E.I. Du Pont de Nemours and Company) ("mylar"). The mylar/polymer/mylar "sandwich" is then placed on top of a small cavity mold with no top cover sheet. The dimensions of the cavity mold are 1"X2"X~0.020". The mold and sample are then placed in a heated hydraulic press. The press temperature is usually set between 150° C. to 200° C. The platens of the press are closed and a force of about 15 tons is maintained for about 3-5 minutes. The platens are then opened while still at the above mentioned prescribed temperature and the mylar/polymer/mylar "sandwich" is removed from the mold. The sample, mylar/polymer/mylar "sandwich" is allowed to anneal for no less than 24 hours, and no greater than 48 hours by hanging in air at room temperature (actual time is to be noted). After the annealing period, the pressed pad is removed from the mylar and cut crosswise then folded over onto itself, forming a double layer. From this double layer a circular disk is cut out, using a leather punch or other paper punch device. Five samples will be prepared. The sample weights will be recorded, and should be no less than 8 mg and no greater than 12 mg. The samples are then placed in individual 10 micro-liter aluminum pans. Unvented aluminum lids will be crimped on top of each pan, insuring good contact between the samples and the pans. The sample pans are then placed in a calibrated DSC instrument with an empty pan with lid on the reference side and run using the following parameters, under $N_2$ purge gas (~20 mL/min). An empty pan will be run in addition to the five samples. Automatic subtraction of the empty pan run from the sample runs will be enabled. The DSC heat history will be as follows. Cool the sample from room temperature to −75° C. as quickly as the DSC is capable. Hold at −75° C. for three minutes. Ramp the temperature at a heating rate of 20° C. per minute to a temperature sufficiently high to completely melt the sample. The thermograms generated from this step are used to determine melting point, specific heat and degree of crystallinity. The output data from DSC consists of time (sec), temperature (° C.), and heat flow (watts). Each of the five sample melting thermograms will be analyzed as follows. First, the total heat flow is divided by the sample mass to obtain a specific heat flow (units: W/g). Second, a baseline is constructed and subtracted from the specific heat flow to give baseline-subtracted heat flow. For the analyses discussed here, a straight-line baseline will be used. The lower temperature baseline limit will be above the glass transition temperature, but below the temperature at which the sample begins to melt. The upper baseline temperature limit will be a temperature 5° C. to 10° C. above the completion of the melting endotherm. The following three parameters will then be determined separately for each of the five runs:

(1) Melting Point—The peak melting temperature is the temperature between the lower and upper baseline settings which has the greatest baseline-subtracted heat flow;

(2) The specific heat of melting, ΔHm (J/g) is the area under the melting endotherm obtained by integrating the baseline-subtracted heat flow versus time between the baseline limits;

(3) The percent crystallinity is determined by dividing the specific heat of melting by 189 J/g and multiplying by 100.

The sample melting temperature, specific heat, and percent crystallinity will be the average over the five runs after excluding outliers. An outlier will be as defined by the method prescribed by Dixon (9(1) BIOMETRICS, 74-89 (March 1953)) using a 95% confidence level.

Preferably, the propylene-based copolymer has crystalline regions interrupted by non-crystalline regions. The non-crystalline regions may result from regions of non-crystallizable polypropylene segments, the inclusion of comonomer units, or both. In one or more embodiments, the propylene-based copolymer has a propylene-derived crystallinity that is isotactic, syndiotactic, or a combination thereof. In a preferred embodiment, the propylene-based copolymer has isotactic sequences. The presence of isotactic sequences can be determined by NMR measurements showing two or more propylene derived units arranged isotactically. Such isotactic sequences may, in some cases be interrupted by propylene units that are not isotactically arranged or by other monomers that otherwise disturb the crystallinity derived from the isotactic sequences.

In one or more embodiments, the propylene-derived units of the propylene-based copolymer have an isotactic triad fraction of about 65% to about 99%. In one or more embodiments, the propylene-derived units of the propylene-based copolymer have an isotactic triad fraction of about 70% to about 98%. In one or more embodiments, the propylene-derived units of the propylene-based copolymer have an isotactic triad fraction of about 75% to about 97%.

The triad tacticity of a polymer is the relative tacticity of a sequence of three adjacent propylene units, a chain consisting of head to tail bonds, expressed as a binary combination of m and r sequences. It is usually expressed for the propylene-based copolymers described as the ratio of the number of units of the specified tacticity to all of the propylene triads in the polymer.

In one or more embodiments above or elsewhere herein, the propylene-based copolymer can have a triad tacticity of about 80% or more, about 83% or more, about 85% or more, about 87% or more, about 90% or more, about 91% or more, about 92% or more, about 93% or more, about 94% or more, or about 95% or more. Preferably, the propylene-based copolymer has a triad tacticity that is greater than or equal to about 80%, preferably greater than or equal to about 85%, or preferably greater than or equal to about 90%. In another embodiment, the propylene-based copolymer can have a triad tacticity, which is about 88% or more, about 90% or more, or about 96% or more. In one or more embodiments, the triad tacticity of the propylene-based copolymer ranges from a lower limit of 80%, or 82%, or 84%, or 86%, to an upper limit of about 88%, 90% 92%, 93%, or 94%, or 95%, or 96%, or more.

The triad tacticity (mm fraction) of a propylene-based copolymer can be determined from a $^{13}$C NMR spectrum and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

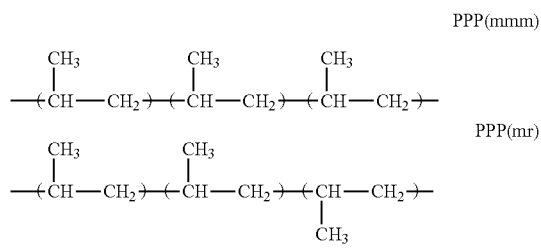

PPP(mmm)

PPP(mr)

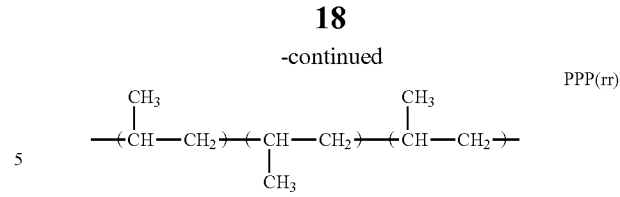

PPP(rr)

The $^{13}$C NMR spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum can be assigned with reference to an article in the journal 30 POLYMER, 1350 (1989). In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). Additional details and information can be found in U.S. Pat. No. 5,504,172.

Examples of 2,1 insertion are shown in structures 1 and 2 below.

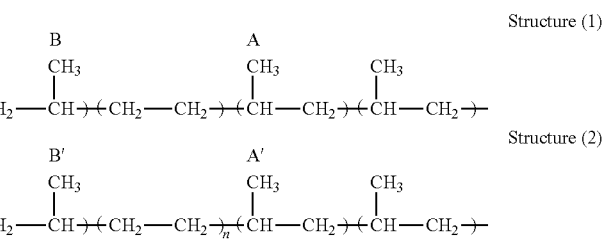

where n≥2.

A peak of the carbon A and a peak of the carbon A' appear in the second region. A peak of the carbon B and a peak of the carbon B' appear in the third region, as described above. Among the peaks which appear in the first to third regions, peaks which are not based on the 3 propylene unit chain consisting of head-to-tail bonds are peaks based on the PPE-methyl group, the EPE-methyl group, the carbon A, the carbon A', the carbon B, and the carbon B'.

The peak area based on the PPE-methyl group can be evaluated by the peak area of the PPE-methine group (resonance in the vicinity of 30.8 ppm), and the peak area based on the EPE-methyl group can be evaluated by the peak area of the EPE-methine group (resonance in the vicinity of 33.1 ppm). The peak area based on the carbon A can be evaluated by twice as much as the peak area of the methine carbon (resonance in the vicinity of 33.9 ppm) to which the methyl group of the carbon B is directly bonded; and the peak area based on the carbon A' can be evaluated by the peak area of the adjacent methine carbon (resonance in the vicinity of 33.6 ppm) of the methyl group of the carbon B'. The peak area based on the carbon B can be evaluated by the peak area of the adjacent methine carbon (resonance in the vicinity of 33.9 ppm); and the peak area based on the carbon B' can be also evaluated by the adjacent methine carbon (resonance in the vicinity of 33.6 ppm).

By subtracting these peak areas from the total peak areas of the second region and the third region, the peak areas based on the three propylene unit chains (PPP(mr) and PPP(rr)) consisting of head-to-tail bonds can be obtained. Thus, the peak areas of PPP(mm), PPP(mr) and PPP(rr) can be evaluated, and the triad tacticity of the propylene unit chain consisting of head-to-tail bonds can be determined.

Similarly, the peak areas based on the 3 propylene units-chains (PPP(mr) and PPP(rr)) consisting of head-to-tail bonds can be obtained by subtracting the peak areas for the error in propylene insertions (both 2,1 and 1,3) from peak areas from the total peak areas of the second region and the third region, Thus, the peak areas of PPP(mm), PPP(mr) and PPP(rr) can be evaluated, and hence the triad tacticity of the propylene unit chain consisting of head-to-tail bonds can be determined.

The proportion of the 2,1-insertions to all of the propylene insertions in a propylene elastomer can be calculated by the following formula as described in Polymer, vol. (1989), p. 1350.

Proportion of inversely inserted unit based on 2,1-insertion (%) is equal to:

$$\frac{0.25 I\alpha\beta(\text{structure}(i)) + 0.5 I\alpha\beta(\text{structure}(ii))}{I\alpha\alpha + I\alpha\beta(\text{structure}(ii)) + 0.5(I\alpha\gamma + I\alpha\beta(\text{structure}(i)) + I\alpha\delta)} \times 100$$

Naming of the peaks in the above formula was made in accordance with a method by Carman, et al. in the journal Rubber Chemistry and Technology, volume 44 (1971), page 781, where $I\alpha\delta$ denotes a peak area of the $\alpha\delta+$ secondary carbon peak. It is difficult to separate the peak area of $I\alpha\beta$ (structure (i)) from $I\alpha\beta$ (structure (ii)) because of overlapping of the peaks. Carbon peaks having the corresponding areas can be substituted therefore.

The measurement of the 1,3 insertion requires the measurement of the $\beta\gamma$ peak. Two structures can contribute to the $\beta\gamma$ peak: (1) a 1,3 insertion of a propylene monomer; and (2) from a 2,1-insertion of a propylene monomer followed by two ethylene monomers. This peak is described as the 1.3 insertion peak and we use the procedure described in U.S. Pat. No. 5,504,172, which describes this $\beta\gamma$ peak and understand it to represent a sequence of four methylene units. The proportion (%) of the amount of these errors was determined by dividing the area of the $\beta\gamma$ peak (resonance in the vicinity of 27.4 ppm) by the sum of all the methyl group peaks and ½ of the area of the $\beta\gamma$ peak, and then multiplying the resulting value by 100. If an $\alpha$-olefin of three or more carbon atoms is polymerized using an olefin polymerization catalyst, a number of inversely inserted monomer units are present in the molecules of the resultant olefin polymer. In polyolefins prepared by polymerization of $\alpha$-olefins of three or more carbon atoms in the presence of a chiral metallocene catalyst, 2,1-insertion or 1,3-insertion takes place in addition to the usual 1,2-insertion, such that inversely inserted units such as a 2,1-insertion or a 1,3-insertion are formed in the olefin polymer molecule (see, Macromolecular Chemistry Rapid Communication, Volume 8, page 305 (1987), by K. Soga, T. Shiono, S. Takemura and W. Kaminski).

Preferably, the proportion of inversely inserted propylene units of the propylene-based copolymer, based on the 2,1-insertion of a propylene monomer in all propylene insertions, as measured by $^{13}C$ NMR, is greater than 0.5%, or greater than 0.6%. The proportion of inversely inserted propylene units of the propylene-based copolymer, based on the 1,3-insertion of a propylene monomer, as measured by $^{13}C$ NMR, is greater than 0.05%, or greater than 0.06%, or greater than 0.07%, or greater than 0.08%, or greater than 0.085%.

Furthermore, the propylene-derived crystallinity of the propylene-based copolymer can be selected to ensure the desired compatibility with the other ingredients of the TPV composition, e.g., with the other polymers in the thermoplastic resin component, as well as with the rubber component and additives. In a preferred aspect, the propylene-derived crystallinity is selected relative to any polypropylene resin present in the thermoplastic resin component. In some embodiments, the tacticity of the propylene-based copolymer and the tacticity of the thermoplastic resin component (which may include two or more different polypropylene polymers) may be the same or substantially the same. By "substantially" it is meant that these two components have at least 80% of the same tacticity. In another embodiment, the components have at least 90% of the same tacticity. In still another embodiment, the components have at least 100% of the same tacticity. Even if the components are of mixed tacticity, e.g., being partially isotactic and partially syndiotactic, the percentages in each should be at least about 80% the same as the other component in at least one or more embodiments.

In another embodiment, the propylene-based copolymers can include copolymers prepared according to the procedures in U.S. Pat. No. 6,884,850. Likewise, the propylene-based copolymer can include polymers consistent with those described in U.S. Pat. Nos.: 6,960,635; 6,919,407; 6,927,256; 6,960,635; 6,943,215; and/or 6,906,160. Additionally, the propylene-based copolymer can include polymers consistent with those described in EP 1 233 191, and U.S. Pat. No. 6,525,157, along with suitable propylene homo- and copolymers described in U.S. Pat. No. 6,770,713 and U.S. Patent Application Publication 2005/215964. The propylene-based copolymer can also include one or more polymers consistent with those described in EP 1 614 699 or EP 1 017 729.

Suitable propylene-based copolymers are commercially available from ExxonMobil Chemical under the tradename VISTAMAXX and from The Dow Chemical Company under the tradename VERSIFY.

Oils/Extenders

In one or more embodiments, the TPV compositions can optionally include mineral oil, synthetic oil, or a combination thereof. These oils can also be referred to as plasticizers or extenders. Mineral oils can include aromatic, naphthenic, paraffinic, and isoparaffinic oils. In one or more embodiments, the mineral oils can be treated or untreated.

Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and in other embodiments from about 700 g/mole to about 1,300 g/mole. In one or more embodiments, these oligomers include isobutenyl mer units. Exemplary synthetic oils include polyisobutylene, poly (isobutylene-co-butene), and mixtures thereof. In one or more embodiments, synthetic oils can include polylinear $\alpha$-olefins, poly-branched $\alpha$-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp, and in other embodiments less than 1,000 cp.

Useful synthetic oils can be commercially obtained under the tradenames POLYBUTENE (Soltex; Houston, Tex.), and INDOPOL (Innouvene). White synthetic oil is available under the tradename SPECTRASYN (ExxonMobil), formerly SHF Fluids (Mobil) and under the tradename ELEVAST (ExxonMobil). Oils described in U.S. Pat. No. 5,936,028 can also be employed. It is believed that synthetic oils can provide enhanced low temperature performance. Also, high temperature performance can be enhanced based upon molecular structure.

In one or more embodiments, the extender oils can include organic esters, alkyl ethers, or combinations thereof including those disclosed in U.S. Pat. Nos. 5,290,866 and 5,397,832, which are incorporated herein by reference. In one or more embodiments, the organic esters and alkyl ether esters can have a molecular weight that is generally less than about 10,000. In one or more embodiments, suitable esters include monomeric and oligomeric materials having an average molecular weight of below about 2,000 and in other embodiments below about 600. In one or more embodiments, the esters can be compatible or miscible with both the polyalphaolefin and rubber components of the composition; i.e., they can mix with other components to form a single phase. In one or more embodiments, the esters include aliphatic mono- or diesters, or alternatively oligomeric aliphatic esters or alkyl ether esters. In one or more embodiments, the TPV compositions are devoid of polymeric aliphatic esters and aromatic esters, as well as phosphate esters.

Polymeric Processing Additives

In one or more embodiments above or elsewhere herein, the TPV can include a polymeric processing additive. The processing additive can be a polymeric resin that has a very high melt flow rate. These polymeric resins include both linear and branched polymers that have a melt flow rate (ASTM D-1238 @ 2.16 kg weight and 230° C.) that is greater than about 500 dg/min, in other embodiments, greater than about 750 dg/min, in other embodiments, greater than about 1000 dg/min, in other embodiments, greater than about 1200 dg/min, and in other embodiments, greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. TPV compositions that include similar processing additives are disclosed in U.S. Pat. No. 6,451,915.

Other Constituents

In addition to the one or more rubber components, thermoplastic components, and optional processing additives, the TPV compositions can further optionally include one or more processing oils (aromatic, paraffinic and napthathenic mineral oils), compatibilizers, calcined clay, kaolin clay, nanoclay, talc, silicates, carbonates, sulfates, carbon black, sand, glass beads, mineral aggregates, wollastonite, mica, glass fiber, other filler, pigments, colorants, dyes, carbon black, dispersants, flame retardants, antioxidants, conductive particles, UV-inhibitors, UV-stabilizers, adhesion promoters, fatty acids, esters, paraffin waxes, neutralizers, metal deactivators, tackifiers, calcium stearate, dessicants, stabilizers, light stabilizer, light absorber, coupling agents including silanes and titanates, plasticizers, lubricants, blocking agents, antiblocking agents, antistatic agents, waxes, foaming agents, nucleating agents, slip agents, acid scavengers, lubricants, adjuvants, surfactants, crystallization aids, polymeric additives, defoamers, preservatives, thickeners, rheology modifiers, humectants, vulcanizing/cross-linking/curative agents, vulcanizing/cross-linking/curative accelerators, cure retarders, reinforcing and non-reinforcing fillers and combinations thereof and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

Amounts

The TPV compositions can contain a sufficient amount of the rubber component to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the TPV compositions can include at least about 25 wt %, in other embodiments at least about 45 wt %, in other embodiments at least about 65 wt %, and in other embodiments at least about 75 wt % of rubber (i.e., dynamically-vulcanized rubber) based upon the total weight of the TPV compositions. In these or other embodiments, the amount of rubber within the TPV compositions can be from about 15 wt % to about 90 wt %, in other embodiments from about 45 wt % to about 85 wt %, and in other embodiments from about 60 wt % to about 80 wt %, based on the entire weight of the rubber and thermoplastic combined.

In one or more embodiments, the amount of thermoplastic polymer (i.e., uncured polymer within the thermoplastic phase) within the TPV compositions can be from about 10 wt % to about 85 wt %, in other embodiments from about 10 wt % to about 40 wt %, and in other embodiments from about 12 wt % to about 30 wt %, based on the entire weight of the rubber and thermoplastic combined. In these or other embodiments, the amount of thermoplastic polymer within the TPV compositions can be from about 25 to about 250 phr, in other embodiments from about 50 to about 150 phr, and in other embodiments from about 60 to about 100 phr thermoplastic polymer.

With respect to the oil, the TPV can include from about 25 to about 250 phr, or from about 50 to about 150 phr, or from about 75 to about 130 phr, of extender oil. The quantity of extender oil added can depend upon the properties desired, with the upper limit depending upon the compatibility of the particular oil and blend ingredients; this limit is exceeded when excessive exuding of extender oil occurs. The amount of extender oil can depend, at least in part, upon the type of rubber. High viscosity rubbers are more highly oil extendable.

Fillers, such as carbon black, clay, talc, or calcium carbonate can be added in amount from about 1 to about 250 phr, in other embodiments from about 10 to about 150 phr, and in other embodiments from about 25 to about 50 phr. The amount of carbon black that can be used can depend, at least in part, upon the type of carbon black and the amount of extender oil that is used.

Curatives

The rubber component can be dynamically vulcanized by a free-radical cure agent or system. Free-radical cure agents can include peroxides such as organic peroxides. Examples of organic peroxides include, but are not limited to, di-tert-butyl peroxide, dicumyl peroxide, t-butylcumyl peroxide, α,α-bis (tert-butylperoxfy) diisopropyl benzene, 2,5-dimethyl-2,5-di (t-butylperoxy)hexane (DBPH), 1,1-di(tert-butylperoxy)-3, 3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof can be used. Others include azo initiators including Luazo™ AP (ARCHEMA). Useful peroxides and their methods of use in dynamic vulcanization of TPV compositions are disclosed in U.S. Pat. No. 5,656,693, which is incorporated herein by reference for purpose of U.S. patent practice. In certain embodiments, cure systems such as those described in U.S. Pat. No. 6,747,099, U.S. Application Publication No. 2004/0195550, and International Patent Application Publication Nos. 2002/28946, 2002/077089, and 2005/092966, can also be employed.

In one or more embodiments, the free-radical cure agent can be employed in conjunction with one or more coagents. Coagents can include high-vinyl polydiene or polydiene copolymer, triallylcyanurate, triallyl isocyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multi-functional acrylates, multi-functional methacrylates, or oximers such as quinone dioxime. Combinations of these coagents can be employed. For example, combinations of high-vinyl polydienes and α-β-ethylenically unsaturated metal carboxylates are useful, as disclosed in US 2007/0021564. Coagents can also be employed as neat liquids or together with a carrier. For example, the multi-functional acrylates or multi-functional methacrylates together with a carrier are useful, as disclosed in US 2007/0083008. Also, the curative and/or coagent can be pre-mixed with the plastic prior to formulation of the TPV, as described in U.S. Pat. No. 4,087,485.

In one or more embodiments, the rubber component can be dynamically vulcanized by a silicon-containing cure system or agent. Silicon-containing cure systems can include silicon hydride compounds having at least two SiH groups. Useful silicon hydride compounds include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028.

In one or more embodiments, the silane-containing compounds can be employed in an amount from about 0.5 to about 5.0 parts by weight, in other embodiments from about 1.0 to about 4.0 parts by weight, and in other embodiments from about 2.0 to about 3.0 parts by weight per 100 parts by weight of rubber. A complementary amount of catalyst can include from about 0.5 to about 20.0 parts, in other embodiments from about 1.0 to about 5.0 parts, and in other embodiments from about 1.0 to about 2.0 parts of metal per million parts by weight of the rubber. In one or more embodiments, the olefinic rubber employed with the hydrosilylation curatives includes diene units deriving from 5-vinyl-2-norbornene.

The skilled artisan will be able to readily determine a sufficient or effective amount of curative and/or coagent to be employed without undue calculation or experimentation. Those skilled in the art appreciate that the amount of curative employed can vary based upon the chemical nature of the peroxide and/or coagent employed. In these or other embodiments, the amount of curative employed can vary based upon the type of rubber employed, as well as the cross-linkable units present within the rubber.

In one or more embodiments, the curative can be added to the rubber component in an amount effective to yield a cure level of the rubber component of at least 95.0%. A sufficient amount can be added so that the resulting cured rubber component can have a degree of curing such that at least 2 wt % (preferably at least 5 wt %, preferably at least 10 wt %, preferably at least 20 wt %, preferably at least 35 wt %, preferably at least 45 wt %, preferably at least 65 wt %, preferably at least 75 wt %, preferably at least 85 wt %) of the rubber component is insoluble after 24 hours in refluxing xylene, calculated after accounting for any additives, fillers, and thermoplastic components.

Preparation of TPV

As is known in the art, TPV compositions can be prepared by dynamic vulcanization of the rubber component(s) in the presence of a non-vulcanizing thermoplastic component. Dynamic vulcanization includes a vulcanization or curing process for a rubber within a blend with a thermoplastic resin, where the rubber can be crosslinked or vulcanized under conditions of high shear at a temperature above the melting point of the thermoplastic. In one embodiment, the rubber can be simultaneously crosslinked and dispersed as fine particles within the thermoplastic matrix, although other morphologies can also exist.

In one or more embodiments, dynamic vulcanization can be effected by employing a continuous process. Continuous processes can include those processes where dynamic vulcanization of the rubber is continuously achieved, TPV product is continuously removed or collected from the system, and/or one or more raw materials or ingredients are continuously fed to the system during the time that it can be desirable to produce or manufacture the product.

In one or more embodiments, continuous dynamic vulcanization can be effected within a continuous mixing reactor, which can also be referred to as a continuous mixer. Continuous mixing reactors can include those reactors that can be continuously fed ingredients and that can continuously have product removed therefrom. Examples of continuous mixing reactors include twin screw or multi-screw extruders (e.g., ring extruder). Methods and equipment for continuously preparing TPV compositions are described in U.S. Pat. Nos. 4,311,628, 4,594,390, 5,656,693, 6,147,160, and 6,042,260, as well as WO 2004/009327 A1, which are incorporated herein by reference, although methods employing low shear rates can also be used. The temperature of the blend as it passes through the various barrel sections or locations of a continuous reactor can be varied as is known in the art. In particular, the temperature within the cure zone can be controlled or manipulated according to the half-life of the curative employed. In particular embodiments, oil is introduced to the mixture. In certain embodiments, the addition of sufficient oil allows for the achievement of particular advantageous properties of the TPV.

Product Characteristics

The TPV compositions can be processed and reprocessed by conventional plastic processing techniques such as extrusion, injection molding, blow molding, and compression molding. The rubber component within the TPV compositions can be in the form of finely-divided and well-dispersed particles of vulcanized or cured rubber within a continuous thermoplastic phase or matrix. In one or more embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 µm, optionally less than 30 µm, optionally less than 10 µm, optionally less than 5 µm, and optionally less than 1 µm. In certain embodiments, at least 50%, optionally at least 60%, and optionally at least 75% of the particles have an average diameter of less than 5 µm, optionally less than 2 µm, and optionally less than 1 µm.

While certain classes of fillers/additives and preferred amounts of specific fillers/additives have been suggested above, more generally (absent specific directions otherwise given herein) the compositions can optionally have one or more fillers/additives, preferably in the amount of less than 80 wt %, or less than 70 wt %, or less than 60 wt %, or less than 50 wt %, or less than 40 wt %, or less than 30 wt %, or less than 20 wt %, or less than 10 wt %, or in other embodiments less than 5 wt %, or less than 2 wt %, or less than 1 wt %, based upon the total weight of the composition. While not critical to the characterization of a "composition comprising a filler/additive," which means that one or more fillers and/or additives are added, a lower limit can be 100 ppm, 500 ppm, 1,000 ppm, or similar amounts. In some cases it can be preferable for there to be no fillers/additives, or in other cases preferred embodiments can be directed to the absence of specific fillers/additives, e.g., some preferred embodiments have no carbonates, no inorganic fillers, and so on. Filler/additives in the nature of unavoidable impurities can of course be present in the case where no filler/additives are purposefully added but in some embodiments it can be useful to further purify ingredients to avoid filler/additives as much as possible. One of ordinary skill in the art, in possession of the present disclosure, can determine the nature and amount of these optional ingredients by routine experimentation.

End-Uses

The TPV compositions can be useful for the fabrication of shaped articles and parts made by using standard elastomer processing techniques like extrusion, calendaring, and molding (e.g., injection or compression molding). Such articles include seals (such as used in building construction or appliances), roofing, tubing, hoses, strips, joints, isolators, wire and cable jackets, medical device components (including syringe parts and catheters), packaging, trays, toys, sporting equipment, furniture, kitchen devices, handles, belts (including power transmission and conveyor belts) and appliance components. Also included are articles for transportation vehicles such as cars, trucks, trains, airplanes, and boats, including weather seals, noise and/or vibration insulation seals and mounts, disks, diaphragms, cups, joints, tubing, hoses, gaskets, o-rings, belts (including synchronous, asynchronous, serpentine, and V belts), wiper blades, mud flaps, skins, mats, boots, bellows, and trim.

In one or more embodiments, the TPV composition can be at least partially adhered or otherwise at least partially attached to a second component or substrate to form a composite structure. The second component can be, or include, another elastomeric composition according to one or more embodiments described, an unplasticized elastomeric composition, a thermoset rubber, a thermoplastic resin or plastic, a TPV, or a metal. In one or more embodiments, the two or more structures are at least partially adhered or otherwise at least partially attached to one another to form a composite structure. Illustrative composite structures include, but are not limited to, molded corners, molded end caps, glass run channels, trunk seals, tailgate seals, cowl seals, gap fillers, glass encapsulation, cut line seals, door seals, hood-to-radiator seals, roof line seals, rocker panels, sashes, and belt-line seals.

EXAMPLES

The foregoing discussion can be further described with reference to the following non-limiting examples. The following examples illustrate the surprising and significant effect of a new peroxide cured "more linear" VNB EPDM rubber and resulting TPV compositions.

Examples 1-8 are TPV formulations prepared in a Brabender batch mixer of 70 cc capacity at 100 revolutions per minute (RPM) and metal set temperature of 180° C. Mixing was done under a nitrogen atmosphere. At time zero the rubber, clay, polypropylene, antioxidant, TAC coagent and (about ⅔ oil, where applicable) were charged. After about 2 minutes of fluxing, peroxide was added and dynamic vulcanization was continued for about 2-3 minutes. Another ⅓ oil was added (where applicable) at around 5 minutes and mixing was continued for a total batch time of about 6 minutes.

Table 1 summarizes the TPV compositions of Examples 1-8. Table 2 summarizes the mixing conditions. All mixing was done under a nitrogen blanket.

Examples 1-2 and 7-8 are TPVs made from Ziegler Natta EPDM rubbers and are included for comparative purposes. Examples 3-6 are TPVs made from MCN-VNB EPDM rubbers, according to one or more embodiments of the invention provided herein.

TABLE 1

| | TPV Compositions | | | | | | | |
|---|---|---|---|---|---|---|---|---|
| Material (phr) | 1 | 2 | 3 | 4 | 5 | 6 | 7 | 8 |
| VISTALON-1703P | 100 | 100 | | | | | | |
| EPDM 1399A | | | 100 | 100 | | | | |
| EPDM 1411A | | | | | 100 | 100 | | |
| VX3676 | | | | | | | 175 | 175 |
| Sunoco F008F | 41 | 41 | 41 | 41 | 41 | 41 | 41 | 41 |
| Chevron 6001R Oil | 75 | 75 | 75 | 75 | 75 | 75 | — | — |
| Clay, ICECAP K (BURGESS) | 42 | 42 | 42 | 42 | 42 | 42 | 42 | 42 |
| PLC(TAC)-50BC (Rhein Chemie) | 3.3 | 3.3 | 3.3 | 3.3 | 3.3 | 3.3 | 3.3 | 3.3 |

TABLE 1-continued

| | TPV Compositions | | | | | | | |
|---|---|---|---|---|---|---|---|---|
| Material (phr) | 1 | 2 | 3 | 4 | 5 | 6 | 7 | 8 |
| EF DBDB-60 (Rhein Chemie) | 2.36 | 2.36 | 2.36 | 2.36 | 2.36 | 2.36 | 2.36 | 2.36 |
| Irganox 1010 (Ciba Geigy) | 1.0 | 1.0 | 1.0 | 1.0 | 1.0 | 1.0 | 1.0 | 1.0 |
| Total PHR | 264.66 | 264.66 | 264.66 | 264.66 | 264.66 | 264.66 | 264.66 | 264.66 |

TABLE 2

| | Mixing Conditions | | | | | | | |
|---|---|---|---|---|---|---|---|---|
| | 1 | 2 | 3 | 4 | 5 | 6 | 7 | 8 |
| RPM | 100 | 100 | 100 | 100 | 100 | 100 | 100 | 100 |
| Set Temperature in Centigrade | 180 | 180 | 180 | 180 | 180 | 180 | 180 | 180 |
| Torque in meter gram at Dump | 64 | 67 | 72 | 73 | 100 | 98 | 123 | 124 |
| Melt Temperature in ° C. at Dump | 180 | 182 | 183 | 184 | 190 | 188 | 189 | 190 |
| Batch Time in minutes | 6 | 6 | 6 | 6 | 6 | 6 | 6 | 6 |

In Examples 1 and 2, VISTALON 1703P is a highly branched, Ziegler-Natta catalyzed EPDM elastomer that is commercially available from ExxonMobil Chemical Company.

In Examples 3-6, the EPDM 1399A and 1411A rubbers are linear, metallocene catalyzed VNB EPDM rubbers ("MCN-VNB EPDM" or "linear VNB-EPDM"). The polymerizations were carried out in a continuous flow stirred tank reactor (CSTR). In each case, monomers comprising ethylene, propylene and VNB were mixed with a solvent (hexane) and delivered to the reactor as a mixed feed stream. The catalyst (rac-dimethylsilylbis (2-methyl-4-phenylindenyl) zirconium dimethyl) and activator (N,N-dimethylanilinium tetrakis (perfluoronapthyl) borate) were pre-mixed in 900 cc of toluene and delivered to the reactors with a metering pump.

The molecular weight was controlled through the choice of reactor temperature, although a chain transfer agent, such as hydrogen, can also be used to facilitate molecular weight control. At the completion of the polymerization run, the reactor was opened and inspected for gel. In all Examples, the product was found to be gel free.

In Examples 7-8, VX3676 is a highly branched, Ziegler-Natta catalyzed EPDM elastomer that is commercially available from ExxonMobil Chemical Company.

In each Example, Sunoco F008F is an isotactic polypropylene (MFR=0.8 dg/min (ASTM D1238) that is commercially available from Sunoco.

The characterization of the EPDM rubber from Examples 1-6 is summarized in Table 3. In Table 3, Molecular weights (number average molecular weight (Mn), weight average molecular weight (Mw), and z-average molecular weight (Mz)) were determined using a Waters 150 Size Exclusion Chromatograph (SEC) equipped with a differential refractive index (DRI) detector, an online low angle light scattering (LALLS) detector and a viscometer (VIS). The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference. Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/mL at room temperature and 1.324 g/mL at 135° C. The injection concentration ranged from 1.0 to 2.0 mg/mL, with lower concentrations being used for higher molecular weight samples.

Mooney Viscosity, ML (1+4) at 125° C., was measured according to ASTM D 1646. Mooney Relaxation Area (MLRA) was determined using ASTM D 1646.

Table 4 summarizes the test results of the resulting TPV compositions.

TABLE 3

| | EPDM Characterization | | | | | | | | | | |
|---|---|---|---|---|---|---|---|---|---|---|---|
| EPDM | Wt % C2 | Wt % VNB | ML | MLRA | Mw, Lalls | Mz, Lalls | Mw, DRI | Mn, DRI | BI | Mw, Lalls/ Mn, DRI | Mz, Lalls/ Mw, Lalls |
| VISTALON 1703P ™ | 76.4 | 0.8 | 23 | 275 | 400,000 | | | 26,700 | 0.2 | 15 | |
| 1399A | 77.2 | 0.59 | 10.4 | 46.4 | 78,752 | 185,685 | 75,807 | 30,205 | 0.81 | 2.6 | 2.36 |
| 1411A | 65.5 | 1.5 | 26.2 | 167 | 147,942 | 420,308 | 119,452 | 43,365 | 0.72 | 3.4 | 2.8 |
| VX3676 | 63 | 3 | 50* | 1172 | 640,523 | 1,275,128 | 441,081 | 141,151 | 0.6 | 4.5 | 3.1 |

*ML with 75 phr oil. When measured without oil ML was about 250.

TABLE 4

Test Results of TPVs

|  | 1 | 2 | 3 | 4 | 5 | 6 | 7 | 8 |
|---|---|---|---|---|---|---|---|---|
| Specific Gravity, ASTM D792 | 0.995 | 0.999 | 0.987 | 0.996 | 0.987 | 0.986 | 0.985 | 0.987 |
| Hardness, ASTM D2240 Shore A, 5 s. | 70 | 71 | 74 | 72 | 69 | 66 | 66 | 66 |
| Hardness, Shore A, 15 s. ISO 868 | 71 | 72 | 76 | 74 | 69 | 67 | 67 | 68 |
| UTS (psi), ISO 37/ASTM D412 | 369 | 466 | 610 | 526 | 741 | 683 | 1000 | 862 |
| UTS (MPa) | 2.5 | 3.2 | 4.2 | 3.6 | 5.1 | 4.7 | 6.9 | 5.9 |
| Elongation at break, (%) | 74 | 119 | 186 | 124 | 216 | 222 | 277 | 251 |
| 100% Mod. (psi), | 332 | 373 | 424 | 465 | 342 | 316 | 321 | 315 |
| 100% Mod. (MPa) | 2.3 | 2.6 | 2.9 | 3.2 | 2.4 | 2.2 | 2.2 | 2.2 |
| Tension Set (%), ASTM D412 | broke | 28.0 | 23.0 | 23.0 | 10.0 | 10.0 | 6.0 | 7.0 |
| Compression set %* | 73 | 82 | 79 | — | 46 | 47 | 30 | 30 |
| LCR Viscosity, Pa s @204° C., 1,200 1/s, ISO 11443 | 102 | 96 | 116 | 98 | 124 | 126 | 129 | 135 |
| Weight Gain (%), ASTM D471 | 174 | 189 | 230 | 196 | 157 | 160 | 122 | 119 |

*25% compression, 22 hrs @ 100° C.; diameter 0.51 in; thickness 0.24 in; ASTM D395 (method B).

Surprisingly, the linear VNB-EPDM rubbers of Examples 3-4 showed significantly improved physical properties at similar VNB content and Mw for a given ethylene content than the branched EPDM rubbers of Comparative Examples 1 and 2. Even more surprising, the linear VNB-EPDM rubbers of Examples 5-6 at lower VNB content and lower Mw for a given ethylene content provided physical properties that approached those of the branched EPDM rubbers of Comparative Examples 7 and 8 with higher VNB content and higher Mw. Accordingly, it would be expected that the linear VNB-EPDM rubbers as provided herein would provide even better properties at the same diene content and Mw, which is nothing short of surprising.

Furthermore, the linear VNB-EPDM rubbers would allow for lower peroxide consumption to achieve the same properties as conventional, branched VNB-EPDM rubber. Conventional wisdom and experience in TPVs has shown that it is necessary to use high molecular weight polymers to obtain the best engineering properties. However, the "more linear" MCN-VNB-EPDM at much lower molecular weight (Mw) obtained excellent efficiency towards peroxide as demonstrated by the very good balance of properties.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A thermoplastic elastomer, comprising:
    about 60 wt % to about 90 wt % of at least partially cured metallocene-produced ethylene-propylene-vinyl norbornene elastomeric rubber component, wherein the vinyl norbornene content of the rubber component is 0.2 wt % to 1.5 wt % and the ethylene content is 50 wt % to 80 wt %; and
    about 10 wt % to about 40 wt % of at least one thermoplastic component;
    wherein the rubber component is at least partially cured using a peroxide curative to yield a cure level of the rubber component of at least 95%,
    wherein the rubber component has a molecular weight distribution (MWD) of less than 4, a weight average molecular weight (Mw) of from 50,000 to 150,000 g/mole, a branching index greater than 0.70, and a Mooney viscosity, ML(1+4 at 125° C.), as determined according to ASTM D1646, of 10 to 26.2; and
    wherein the thermoplastic elastomer has (as determined according to ASTM D412): an ultimate tensile stength of 3.6-5.1 MPa, an elongation at break of 124% to 222%, and a tension set of 10.0% to 23.0%.

2. The thermoplastic elastomer of claim 1, wherein the thermoplastic component is polypropylene having a heat of fusion of less than 210 J/g and greater than 90 J/g.

3. The thermoplastic elastomer of claim 1, wherein the ethylene content of the rubber component is about 50 wt % to about 70 wt %.

4. The thermoplastic elastomer of claim 1, wherein the thermoplastic component is selected from the group consisting of theroplastic homopolymers and copolymers of propylene, polybutylene, homopolymers and copolymers of ethylene, polyethylene terephthalate, polybutylene terephthalate, polyamides, and mixtures thereof.

5. The thermoplastic elastomer of claim 1, wherein the amount of peroxide curative is about 2 phr to about 5 phr.

6. The thermoplastic elastomer of claim 1, further comprising less than 5.0 phr oil.

7. The thermoplastic elastomer of claim 1, wherein the thermoplastic elastomer has a compression set of about 80% or less, as measured after 22 hours at 100° C. by test method ASTM D 395B.

8. A thermoplastic elastomer, comprising:
    about 60 wt % to about 90 wt % of at least partially cured metallocene-produced ethylene-propylene-vinyl norbornene elastomeric rubber component, wherein the vinyl norbornene content of the rubber component is 0.2 wt % to 1.5 wt % and the ethylene content is 50 wt % to 80 wt %;
    about 10 wt % to about 40 wt % of at least one thermoplastic component comprising polypropylene having a heat of fusion of less than 210 J/g and greater than 90 J/g; and less than 5.0 phr oil, wherein the rubber component is at least partially cured using a peroxide curative to yield a cure level of the rubber component of at least 95.0%, wherein the rubber component has molecular weight distribution (MWD) less than 4, a weight average molecular weight (Mw) of from 50,000 to 150,000 g/mole, a branching index of 0.70 or more, and a Mooney viscosity, ML(1+4 at 125° C.), as determined according to ASTM D1646, of 10 to 26.2, and wherein the thermoplastic elastomer has a compression set of about 80% or less, as measured after 22 hours at 100° C. by test method ASTM D 395B, an untimate tensile strength (ASTM D412) of 3.6-5.1 MPa, an elongation at break (ASTM D412) of 124% to 222%, and a tension set (ASTM D412) of 10.0% to 23.0%.

* * * * *

UNITED STATES PATENT AND TRADEMARK OFFICE
CERTIFICATE OF CORRECTION

| | | |
|---|---|---|
| PATENT NO. | : 8,969,481 B2 | Page 1 of 1 |
| APPLICATION NO. | : 13/127826 | |
| DATED | : March 3, 2015 | |
| INVENTOR(S) | : Maria D. Ellul and Periagaram S. Ravishankar | |

It is certified that error appears in the above-identified patent and that said Letters Patent is hereby corrected as shown below:

In the Claims

In Column 30, Line 46, Claim 4, please delete "theroplastic" and substitute therefore --thermoplastic--.

In Column 30, Lines 60 to 61, Claim 8, please delete "nor-bomene" and substitute therefore --norbornene--.

In Column 30, Line 62, Claim 8, please delete "norbomene" and substitute therefore --norbornene--.

Signed and Sealed this
Thirtieth Day of June, 2015

Michelle K. Lee
*Director of the United States Patent and Trademark Office*